US012632736B2

(12) United States Patent
Gervais et al.

(10) Patent No.: US 12,632,736 B2
(45) Date of Patent: May 19, 2026

(54) COMPUTING DEVICE AND METHOD USING A NEURAL NETWORK TO BYPASS CALIBRATION DATA OF AN INFRARED SENSOR

(71) Applicant: Distech Controls Inc., Brossard (CA)

(72) Inventors: Francois Gervais, Lachine (CA); Jean-Simon Boucher, Sainte-Julie (CA)

(73) Assignee: Distech Controls Inc., Brossard (CA)

( * ) Notice: Subject to any disclaimer, the term of this patent is extended or adjusted under 35 U.S.C. 154(b) by 1195 days.

(21) Appl. No.: 17/119,056

(22) Filed: Dec. 11, 2020

(65) Prior Publication Data

US 2022/0188640 A1 Jun. 16, 2022

(51) Int. Cl.
 *G06N 3/084* (2023.01)
 *G06N 3/04* (2023.01)
(52) U.S. Cl.
 CPC .............. *G06N 3/084* (2013.01); *G06N 3/04* (2013.01)
(58) Field of Classification Search
 None
 See application file for complete search history.

(56) References Cited

U.S. PATENT DOCUMENTS

| | | | | | |
|---|---|---|---|---|---|
| 2014/0374602 | A1* | 12/2014 | Falcone | ................... | H10F 39/12 |
| | | | | | 250/341.1 |
| 2019/0195694 | A1* | 6/2019 | Tang | ......................... | G01J 5/56 |
| 2020/0247063 | A1 | 8/2020 | Pinskiy | | |
| 2020/0410322 | A1 | 12/2020 | Naphade | | |
| 2021/0078382 | A1 | 3/2021 | Maeng | | |
| 2021/0247735 | A1* | 8/2021 | Luan | ...................... | B33Y 50/00 |
| 2022/0146319 | A1* | 5/2022 | Chang | ........................ | G01J 5/53 |
| 2022/0174934 | A1* | 6/2022 | Germain | .............. | A01B 79/005 |
| 2023/0204428 | A1* | 6/2023 | Maegawa | ............. | G01J 5/0806 |
| | | | | | 374/121 |
| 2023/0288910 | A1* | 9/2023 | Chen | ...................... | G06T 3/4046 |

OTHER PUBLICATIONS

Yang, H. et al., "Laser molten pool temperature detecting based on recursive estimation in 3D printing," 2019 4th Intl. Conf. on Mechanical, Control and Computer Engineering (ICMCCE 2019) pp. 284-288. (Year: 2019).*

(Continued)

*Primary Examiner* — Brian M Smith
(74) *Attorney, Agent, or Firm* — Sikand IP Law PLLC

(57) ABSTRACT

Method and computing device using a neural network to bypass calibration data of an infrared sensor. A predictive model generated by a neural network training engine is stored by the computing device. The computing device determines a two-dimensional (2D) matrix of raw sensor data. Each raw sensor datum is representative of heat energy collected by the infrared sensor. The computing device executes a neural network inference engine. The neural network inference engine implements the neural network using the predictive model for generating outputs based on inputs. The inputs comprise the 2D matrix of raw sensor data. The outputs comprise a 2D matrix of inferred temperatures. A method for training a neural network to bypass calibration data of an infrared sensor is also provided.

20 Claims, 11 Drawing Sheets

(56) References Cited

OTHER PUBLICATIONS

Egashira, K. et al., "Infrared sensor module using uncooled 320×240/604×480 detector," Infrared Technology and Applications XXXIII (Apr. 2007) 11 pp. (Year: 2007).*

Sadeghi, M. et al., "Improving near real-time precipitation estimation using a U-Net convolutional neural network and geographical information," Environmental Modelling & Software, vol. 134 (Dec. 2020) 14 pp. (Year: 2020).*

TIM, stackexchange user, response in the post "When should linear regression be called 'machine learning'?" downloaded from < stats.stackexchange.com/questions/268755/when-should-linear-regression-be-called-machine-learning> edited Oct. 3, 2018. (Year: 2018).*

Tan, J. et al., "Deep learning convolutional neural network for the retrieval of land surface temperature from AMSR2 data in China," Sensors 2019, vol. 19, No. 2987 (Jul. 6, 2019) 20 pp. (Year: 2019).*

Bergmann, Paul, et al. "Improving Unsupervised Defect Segmentation by Applying Structural Similarity to Autoencoders," arXiv 1807.02011 (Feb. 1, 2019).

"Radiometric Calibration of Digital Counts of Infrared Thermal Cameras," authored by Othón González-Chávez, et al., which was published in IEEE Transactions on Instrumentation and Measurement, vol. 68, No. 11, Nov. 2019.

Non-Final Office Action issued by the U.S. Patent and Trademark Office in U.S. Appl. No. 17/144,744, mailed Sep. 20, 2024, U.S. Patent and Trademark Office, Alexandria, VA.

Non-Final Office Action issued by the U.S. Patent and Trademark Office in U.S. Appl. No. 17/144,744, mailed Apr. 23, 2025, U.S. Patent and Trademark Office, Alexandria, VA.

Final Office Action issued by the U.S. Patent and Trademark Office in U.S. Appl. No. 17/144,744, mailed Oct. 23, 2025, U.S. Patent and Trademark Office, Alexandria, VA.

* cited by examiner

```
┌─────────────────┐
│ Training server │
│      300        │
└────────┬────────┘
         │
┌────────┴────────────┐
│ Execute a neural network
│    training engine
│ to generate a predictive model
│         505         │
└────────┬────────────┘
         │
┌────────┴────────────┐              ┌──────────────────────┐
│ Transmit the predictive model ────→│ Receive the predictive model │
│         510         │              │         515          │
└─────────────────────┘              └──────────┬───────────┘
                                                │
                                     ┌──────────┴───────────┐
                                     │ Store the predictive model │
                                     │         520          │
                                     └──────────┬───────────┘
                                                │
┌─────────────┐          ┌───────────────────────────────────────────┐
│  IR Sensor  │ ───────→ │ Receive a two-dimensional matrix of raw sensor data │
│     200     │          │   representative of collected heat energy   │
└─────────────┘          │                   525                       │
                         └──────────────────┬────────────────────────┘
                                            │
                         ┌ ─ ─ ─ ─ ─ ─ ─ ─ ─┴─ ─ ─ ─ ─ ─ ─ ─ ─ ─┐
                         │     Receive additional parameter(s)      │
                         │                  530                     │
                         └ ─ ─ ─ ─ ─ ─ ─ ─ ─┬─ ─ ─ ─ ─ ─ ─ ─ ─ ─┘
                                            │
        ┌───────────────────────────────────┴───────────────────────────────────┐
        │ Execute a neural network inference engine implementing a neural network │
        │     using the predictive model for generating outputs based on inputs,   │
        │      the inputs comprising the two-dimensional matrix of raw sensor data, │
        │    the outputs comprising a two-dimensional matrix of inferred temperatures │
        │                                  535                                     │
        └──────────────────────────────────────────────────────────────────────┘
```

Computing Device
100

COMPUTING DEVICE AND METHOD USING A NEURAL NETWORK TO BYPASS CALIBRATION DATA OF AN INFRARED SENSOR

TECHNICAL FIELD

The present disclosure relates to the field of infrared sensors. More specifically, the present disclosure presents a computing device and method using a neural network to bypass calibration data of an infrared sensor.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

One type of sensor used in the context of environment control systems is an infrared IR (sensor), such as for example an IR camera. A commonly used output of the IR sensor is a temperature measurement, or a two-dimensional (2D) matrix of temperature measurements. The temperature measurement(s) generated by the IR sensor may have different applications, such as detecting the presence of a person in an area, counting the number of persons present in an area, evaluating the body temperature of a person, evaluating the external temperature of an object, etc. The temperature measurement(s) performed by the IR sensor is used, generally in combination with data from other sensors (e.g. a temperature sensor), by an environment controller for controlling operations of one or more controlled appliance. For example, a heater or a light is switched on when the temperature measurement(s) performed by the IR sensor is indicative of the presence of one or more person in the area.

The present disclosure focuses on IR cameras (or any other type of IR sensor) which generate a two-dimensional (2D) matrix of temperature measurements. The IR camera includes an IR detection module which generates raw sensor data, the raw sensor data being converted by the IR camera into the 2D matrix of temperature measurements. The conversion is based on one or more calibration table stored in a memory of the IR camera. A processing unit of the IR camera implements a conversion algorithm, the conversion algorithm using the calibration table(s) to convert the raw sensor data into the 2D matrix of temperature measurements.

For a given IR camera, the calibration table(s) stored in the IR camera may not be perfectly adapted to the IR camera, which results in errors in values of the 2D matrix of temperature measurements generated by the given IR camera. For example, the given IR camera is a low end IR camera, and the manufacturer did not invest the time and money necessary to generate sufficiently accurate calibration table(s). In another example, the same generic calibration tables are used for all the IR cameras belonging to a given model of camera. However, a minor difference in operating characteristics of an IR camera of the given model of camera may result in the aforementioned errors. Similarly, a minor defect in the IR detection module of the IR camera may also result in the aforementioned errors.

Therefore, there is a need for a computing device and method using a neural network to bypass calibration data of an infrared sensor.

SUMMARY

According to a first aspect, the present disclosure relates to a computing device. The computing device comprises a communication interface, memory, and a processing unit comprising one or more processor. The memory stores a predictive model generated by a neural network training engine. The processing unit is configured to receive, via the communication interface, a two-dimensional (2D) matrix of raw sensor data from an infrared (IR) sensor. Each raw sensor datum is representative of heat energy collected by the IR sensor. The processing unit is further configured to execute a neural network inference engine. The neural network inference engine implements a neural network using the predictive model for generating outputs based on inputs. The inputs comprise the 2D matrix of raw sensor data. The outputs comprise a 2D matrix of inferred temperatures.

According to a second aspect, the present disclosure relates to a method using a neural network to bypass calibration data of an infrared sensor. The method comprises storing a predictive model generated by a neural network training engine in a memory of a computing device. The method comprises determining by a processing unit of the computing device a two-dimensional (2D) matrix of raw sensor data. Each raw sensor datum is representative of heat energy collected by the IR sensor. The method comprises executing by the processing unit of the computing device a neural network inference engine. The neural network inference engine implements the neural network using the predictive model for generating outputs based on inputs. The inputs comprise the 2D matrix of raw sensor data. The outputs comprise a 2D matrix of inferred temperatures.

According to a third aspect, the present disclosure relates to a method for training a neural network to bypass calibration data of an infrared (IR) sensor. The method comprises the step of (a) initializing by a processing unit of a computing device a predictive model of a neural network. The method comprises the step of (b) generating by the processing unit of the computing device training data. The training data comprise a plurality of two-dimensional (2D) matrices of raw sensor data representative of heat energy collected by a target IR sensor and a corresponding plurality of 2D matrices of temperature measurements generated by a reference IR sensor. The method comprises the step of (c) executing by the processing unit of the computing device a neural network training engine. The neural network training engine implements the neural network using the predictive model for generating outputs based on inputs. The outputs comprise a 2D matrix of inferred temperatures. The inputs comprise a given 2D matrix of raw sensor data among the plurality of 2D matrices of raw sensor data. The method comprises the step of (d) adjusting by the processing unit of the computing device the predictive model of the neural network, to minimize a difference between the 2D matrix of inferred temperatures and a given 2D matrix of temperature measurements among the plurality of 2D matrices of temperature measurements, the given 2D matrix of temperature measurements corresponding to the given 2D matrix of raw sensor data.

In a particular aspect, steps (c) and (d) are repeated for several 2D matrices of raw sensor data among the plurality of 2D matrices of raw sensor data.

BRIEF DESCRIPTION OF THE DRAWINGS

Embodiments of the disclosure will be described by way of example only with reference to the accompanying drawings, in which:

FIG. 4 illustrates a method implemented by the computing device of FIG. 1, using a neural network to bypass calibration data of the IR sensor of FIG. 1;

DETAILED DESCRIPTION

Figure 1:
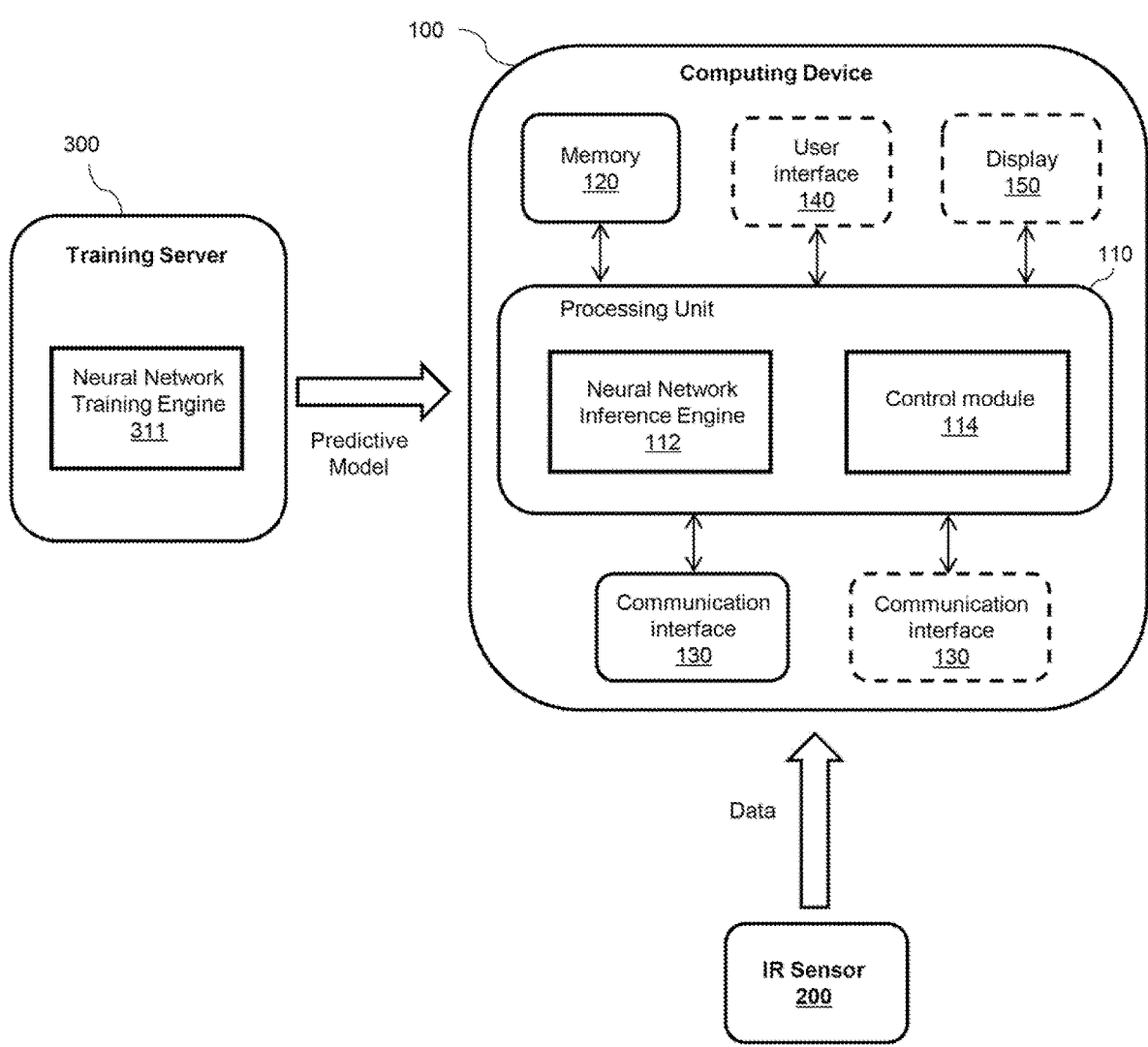
FIG. 1 illustrates an environment control system comprising a computing device and an infrared (IR) sensor.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for addressing the inaccuracy of temperature measurements provided by an infrared sensor. A neural network is used in place of a conversion algorithm using calibration table(s), to generate the temperature measurements based on raw sensor data provided by the infrared sensor.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

Referring now to FIGS. 1, 2A, 2B and 3, an environment control system comprising a computing device 100 is illustrated. For example, the computing device 100 is an environment controller 100 exchanging data with other environment control devices (ECDs). The environment controller 100 is responsible for controlling the environment of an area of a building. The environment controller 100 receives from sensors (e.g. from an infrared (IR) sensor 200) environmental characteristic values measured by the sensors. The environment controller 100 generates commands based on the received environmental characteristic values. The generated commands are transmitted to controlled appliances (not represented in the Figures for simplification purposes), to control operations of the controlled appliances.

The area under the control of the computing device 100 is not represented in the Figures for simplification purposes. As mentioned previously, the area may consist of a room, a floor, an aisle, etc. However, any type of area located inside any type of building is considered being within the scope of the present disclosure.

Details of the computing device 100, the IR sensor 200 and the training server 300 will now be provided.

As illustrated in FIG. 1, the computing device 100 comprises a processing unit 110, memory 120, and a communication interface 130. The computing device 100 may comprise additional components, such as another communication interface 130, a user interface 140, a display 150, etc.

The processing unit 110 comprises one or more processors (not represented in the Figures) capable of executing instructions of a computer program. Each processor may further comprise one or several cores. The processing unit 110 executes a neural network inference engine 112 and a control module 114, as will be detailed later in the description.

The memory 120 stores instructions of computer program (s) executed by the processing unit 110 (for implementing the neural network inference engine 112, the control module 114, etc.), data generated by the execution of the computer program(s), data received via the communication interface 130 (or another communication interface), etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), flash, etc.).

The communication interface 130 allows the computing device 100 to exchange data with remote devices (e.g. with the IR sensor 200, controlled appliance(s), a training server 300, etc.) over a communication network (not represented in FIG. 1 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network, Bluetooth®, Bluetooth® Low Energy (BLE), etc. In still another example, the environment controller 100 comprises two communication interfaces 130. The environment controller 100 communicates with the IR sensor 200 and controlled appliance(s) via a first communication interface 130 (e.g. a Wi-Fi interface); and communicates with other devices (e.g. the training server 300) via a second communication interface 130 (e.g. an Ethernet interface). Each communication interface 130 usually comprises a combination of hardware and software executed by the hardware, for implementing the communication functionalities of the communication interface 130.

Figure 2A:
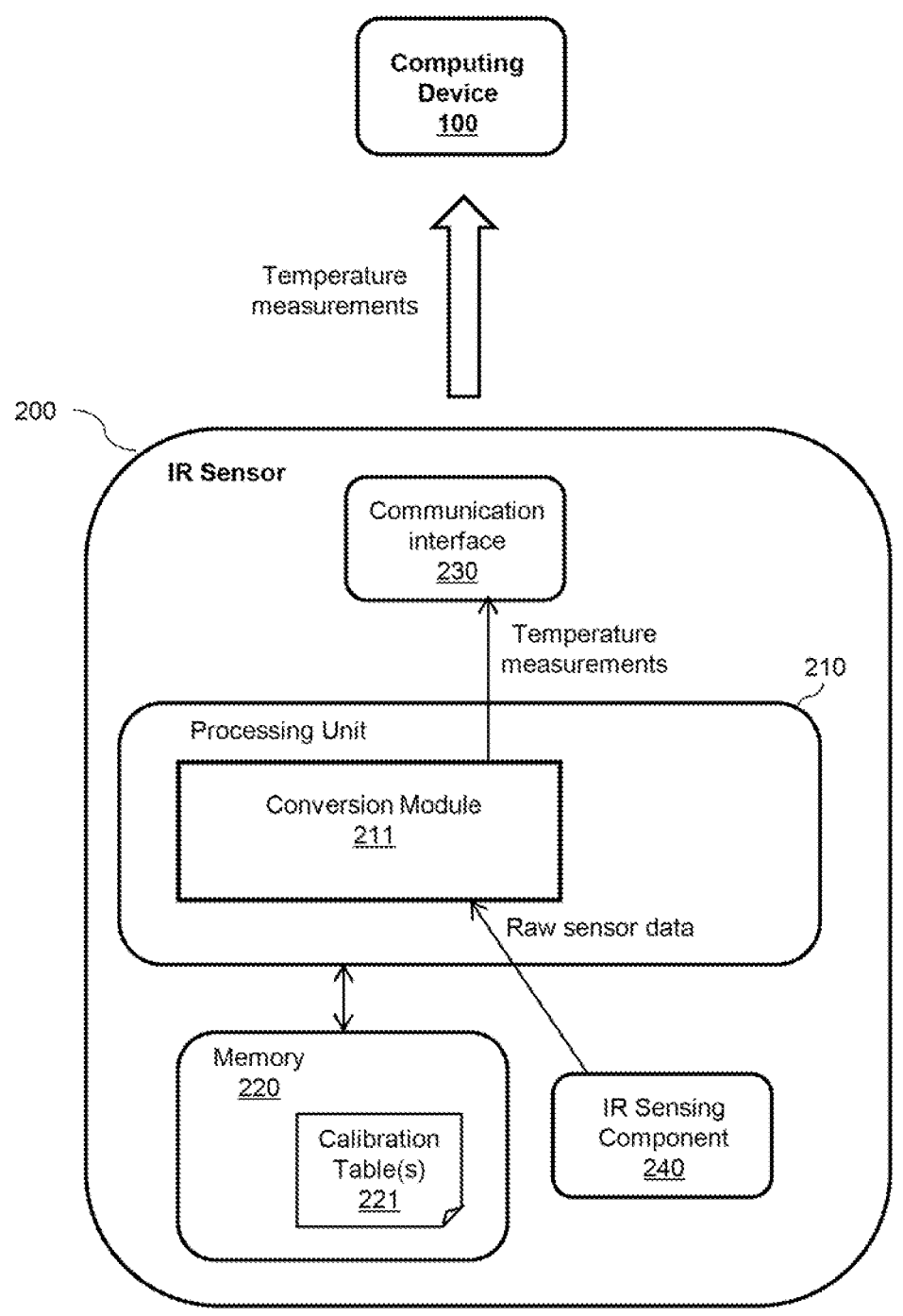
FIGS. 2A and 2B provide a detailed representation of the IR sensor of FIG. 1.
Figure 2B:
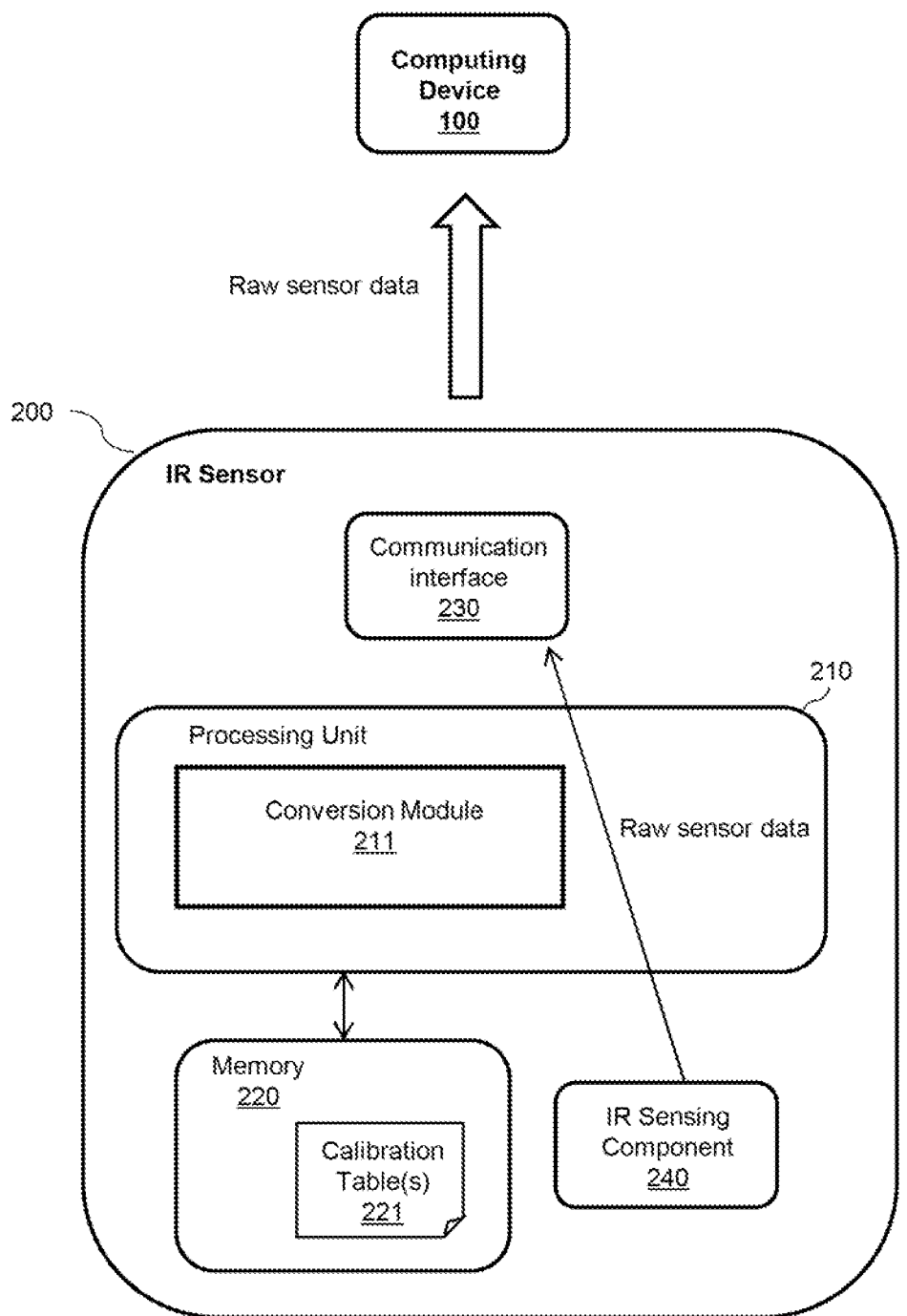

As illustrated in FIGS. 2A-B, the IR sensor 200 comprises a processing unit 210, memory 220, a communication interface 230 and an IR sensing component 240. The IR sensor 200 may comprise additional components not represented in the Figures. An example of IR sensor 200 consists of an IR camera. However, other types of IR sensor may be used in place of an IR camera.

The processing unit 210 of the IR sensor 200 is similar to the processing unit 110 of the computing device 100. The processing unit 210 executes a conversion module 211, as will be detailed later in the description.

The memory 220 of the IR sensor 200 is similar to the memory 120 of the computing device 100. The memory 220 stores instructions of computer program(s) executed by the processing unit 210 for implementing the conversion module 211, etc. The memory 220 also stores calibration table(s) 221, which will be detailed later in the description.

The communication interface 230 of the IR sensor 200 is similar to the communication interface 130 of the computing device 100. The communication interface 230 allows the IR sensor 200 to exchange data with remote devices (e.g. with the computing device 100, etc.) over a communication network (not represented in FIGS. 2A-B for simplification purposes). The communication interface 230 is generally a wireless communication interface, such as a Wi-Fi interface.

The IR sensing component 240 is well known in the art of IR sensors. The IR sensing component 240 generates raw sensor data. The conversion module 211 executed by the processing unit 210 is a software implementing a conversion algorithm. The conversion algorithm uses the calibration table(s) 221 to convert the raw sensor data into corresponding temperature measurements. The raw sensor data may be pre-processed, before processing by the conversion algorithm.

For example, in the case of a low end IR camera, the IR sensing component 240 performs thermographic IR imaging, which consists in detecting radiations in the electromagnetic spectrum with wavelengths in the range of substantially 900 to 14 000 nanometers. The IR sensing component 240 implements a thermal detector which collects heat energy. The thermal detector produces a signal voltage proportional to the collected heat energy. The signal voltage is converted into a digital count by an Analog to Digital (A/D) converter. The A/D converter (not represented in FIGS. 2A-B for simplification purposes) may be integrated to the IR sensing component 240 or to the processing unit 210. In this exemplary implementation, the raw sensor data represented in FIGS. 2A-B consist of the digital counts, which are integers encoded on a given number of bits (e.g. 14 bits providing a range of values of 0 to 16383). The conversion algorithm converts each digital count into a corresponding temperature measurement, using the calibration table(s) 221. The details of how the conversion algorithm and the calibration table(s) 221 are implemented are out of the scope of the present disclosure. The conversion algorithm generally operates in two steps. In a first step, the digital count is converted into a radiance value. In a second step, the radiance value is converted into the temperature measurement, using a known or measured emissivity value of the target object (or person) which temperature is measured.

FIG. 2A illustrates the aforementioned process, where the conversion module 211 converts the raw sensor data into temperature measurements, which are transmitted to the computing device 100. As mentioned previously, the temperature measurements are subject to errors.

FIG. 2B illustrates a new process, where the conversion module 211 is bypassed. The raw sensor data are transmitted to the computing device 100, which uses the neural network inference engine 112 for inferring temperatures based on the received raw sensor data. The objective is to obtain more accurate temperature values, through appropriate neural network training.

As mentioned previously, the present disclosure addresses IR sensors 200 which generate a two-dimensional (2D) matrix of inferred temperatures.

Referring back to FIG. 2A, the conversion module 211 receives a 2-D matrix of raw sensor data, comprising M lines and N columns (for example, M is equal to 24 and N is equal to 32), as follows:

$$\begin{bmatrix} R_{1,1} & R_{1,2} & \dots & R_{1,M} \\ R_{2,1} & R_{2,2} & \dots & R_{2,M} \\ \dots & & & \\ R_{N,1} & R_{N,2} & \dots & R_{N,M} \end{bmatrix}$$

The conversion module 211 generates a 2-D matrix of temperature measurements, comprising M lines and N columns, as follows:

$$\begin{bmatrix} T_{1,1} & T_{1,2} & \dots & T_{1,M} \\ T_{2,1} & T_{2,2} & \dots & T_{2,M} \\ \dots & & & \\ T_{N,1} & T_{N,2} & \dots & T_{N,M} \end{bmatrix}$$

Each value of the matrix of raw sensor data is representative of heat energy collected by the IR sensing component 240. Each corresponding value $T_{i,j}$ of the matrix of temperature measurements is calculated by applying the calibration table(s) 221 to the value of $R_{i,j}$.

Figure 3:
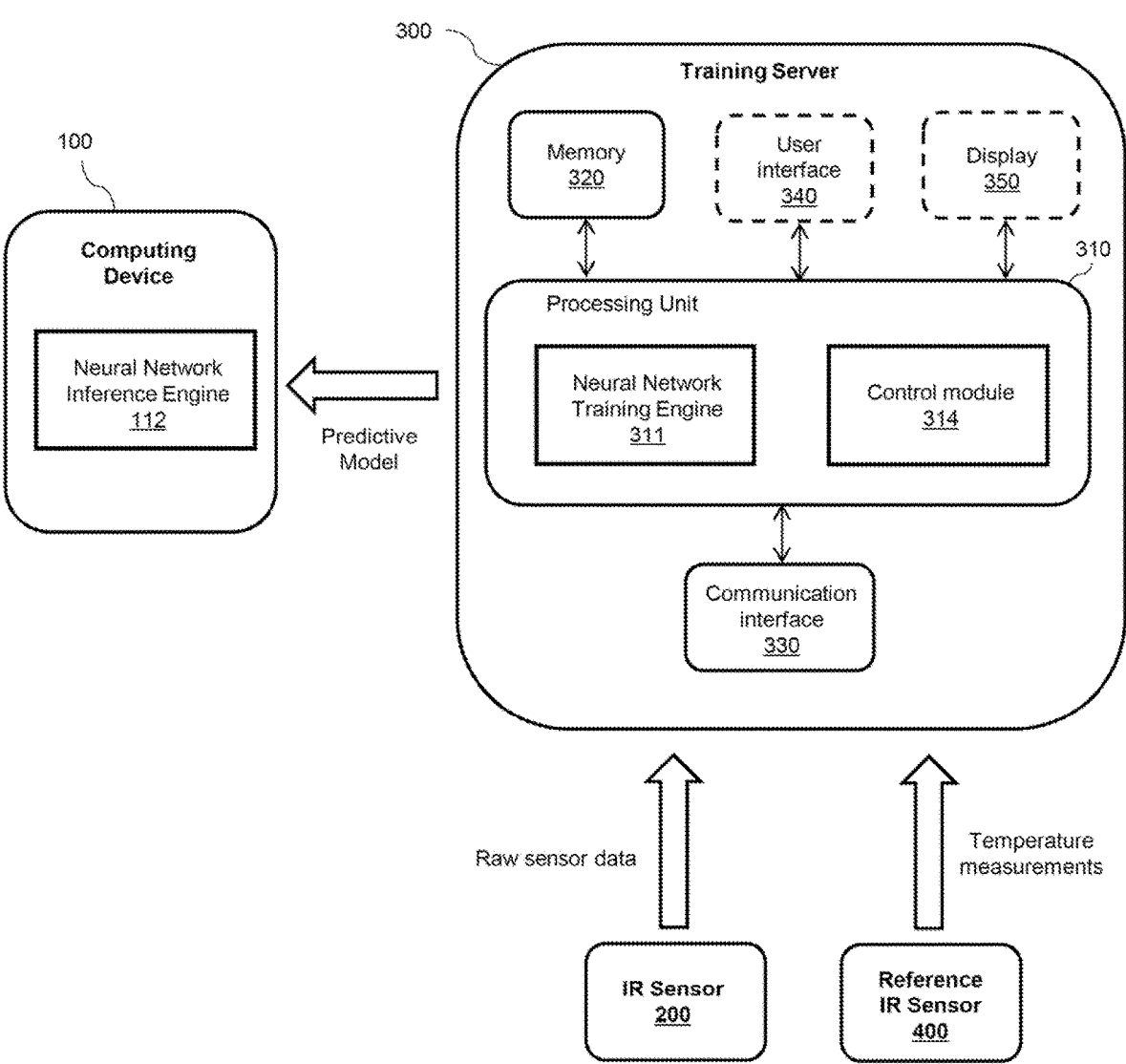
FIG. 3 provides a detailed representation of a training server represented in FIG. 1.

As illustrated in FIG. 3, the training server 300 comprises a processing unit 310, memory 320 and a communication interface 330. The training server 300 may comprise additional components, such as a user interface 340, a display 350, etc.

The processing unit 310 of the training server 300 is similar to the processing unit 110 of the computing device 100. The processing unit 310 executes a neural network training engine 311 and a control module 314, as will be detailed later in the description.

The memory 320 of the training server 300 is similar to the memory 120 of the computing device 100. The memory 320 stores instructions of computer program(s) executed by the processing unit 310 for implementing the neural network training engine 311, the control module 314, etc.

The communication interface 330 of the training server 300 is similar to the communication interface 130 of the computing device 100. The communication interface 330 allows the training server 300 to exchange data with remote devices (e.g. with the computing device 100, etc.) over a communication network (not represented in FIG. 3 for simplification purposes).

The execution of the neural network training engine 311 generates a predictive model of a neural network, which is transmitted to the computing device 100 via the communication interface of the training server 300. The predictive model is transmitted over a communication network and received via the communication interface 130 of the computing device 100.

Reference is now made concurrently to FIGS. 1, 2A, 2B, 3 and 4; where FIG. 4 represents a method 500. At least some of the steps of the method 500 are implemented by the computing device 100. The method 500 aims at using a neural network to bypass calibration data of an IR sensor. The present disclosure is not limited to the method 500 being implemented by the computing device 100 represented in FIG. 1, but is applicable to any type of computing device capable of implementing the steps of the method 500.

A dedicated computer program has instructions for implementing at least some of the steps of the method 500. The instructions are comprised in a non-transitory computer program product (e.g. the memory 120) of the computing device 100. The instructions provide for using a neural network to bypass calibration data of an IR sensor, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The instructions of the dedicated computer program executed by the processing unit 110 implement the neural network inference engine 112 and the control module 114. The neural network inference engine 112 provides functionalities of a neural network, allowing to infer output(s) based on inputs using the predictive model (generated by the training server 300), as is well known in the art. The control module 114 provides functionalities allowing the computing device 100 to interact with and control other devices (e.g. the IR sensor 200 and the training server 300).

The method 500 comprises the step 505 of executing the neural network training engine 311 to generate the predictive model. Step 505 is performed by the processing unit 310 of the training server 300. The predictive model comprises parameters of a neural network implemented by the neural network training engine 311. This step will be further detailed later in the description and details relative to the parameters of the neural network will be provided.

The method 500 comprises the step 510 of transmitting the predictive model generated at step 505 to the computing device 100, via the communication interface 330 of the training server 300. Step 510 is performed by the processing unit 310 of the training server 300.

The method 500 comprises the step 515 of receiving the predictive model from the training server 300, via the communication interface 130 of the computing device 100. Step 515 is performed by the processing unit 110 of the computing device 100.

The method 500 comprises the step 520 of storing the predictive model in the memory 120 of the computing device 100. Step 520 is performed by the processing unit 110 of the computing device 100.

The method 500 comprises the step 525 of receiving a two-dimensional matrix of raw sensor data from the IR sensor 200, via the communication interface 130 of the computing device 100. Step 525 is performed by the processing unit 110 of the computing device 100. Each raw sensor datum is representative of heat energy collected by the IR sensing component 240 of the IR sensor 200.

A person skilled in the art would readily understand that various types of data structures may be used for representing, transmitting and storing the two-dimensional matrix of raw sensor data (based on a particular implementation of the IR sensor 200 and/or computing device 100).

The method 500 comprises the optional step 530 of receiving additional parameter(s), via the communication interface 130 of the computing device 100. Step 530 is performed by the processing unit 110 of the computing device 100. Step 530 will be detailed in relation to step 535.

The method 500 comprises the step 535 of executing the neural network inference engine 112. The neural network inference engine 112 implements a neural network using the predictive model (stored at step 520) for generating outputs based on inputs. The execution of the neural network inference engine 112 is performed by the processing unit 110 of the computing device 100. This step will be further detailed later in the description.

The inputs comprise the two-dimensional matrix of raw sensor data received at step 525.

The outputs comprise a two-dimensional matrix of inferred temperatures.

The inputs used by the neural network inference engine 112 may include additional parameter(s), received at step 530. For example, the inputs include an additional parameter consisting of an ambient temperature of the IR sensor 200. The ambient temperature is representative of the temperature in the environment (e.g. an area of a building, such as a room) where the IR sensor 200 is operating. The ambient temperature is measured by a standalone ambient temperature sensor, and transmitted to the computing device 100 by the standalone ambient temperature sensor. Alternatively, the ambient temperature sensor is integrated to the IR sensor 200, and the ambient temperature measured by the integrated ambient temperature sensor is transmitted to the computing device 100 by the IR sensor 200. The ambient temperature sensor is not represented in the Figures for simplification purposes.

In another example, the inputs include an additional parameter consisting of an input voltage of the IR sensor 200. The input voltage is measured by a voltage sensor integrated to the IR sensor 200, and transmitted to the computing device 100 by the IR sensor 200. The voltage sensor is not represented in the Figures for simplification purposes.

During the training phase, the predictive model generated by the neural network training engine 311 takes into account the additional parameter(s) if applicable.

Steps 515, 520, 525 and 530 of the method 500 are performed by the control module 114 executed by the processing unit 110. Additional steps not represented in FIG. 4 may be performed by the control module 114. For example, the two-dimensional matrix of inferred temperatures is used (optionally in combination with other data collected from other sensors) to generate command(s) for controlling controlled appliance(s).

In another implementation, steps 520, 525, 530 and 535 are performed by the IR sensor 200. The processing unit 210 of the IR sensor 200 has enough processing power to execute a neural network. The predictive model is received via the communication interface 230 of the IR sensor 200 and stored in the memory 220 of the IR sensor 200. The processing unit 210 of the IR sensor 200 executes the neural network inference engine 112. The two-dimensional matrix of raw sensor data is received from the IR sensing component 240, or generated by the processing unit 210 based on data received from the IR sensing component 240. The two-dimensional matrix of inferred temperatures (generated by the neural network inference engine 112) is transmitted via the communication interface 230 to one or more third party devices (e.g. an environment controller).

Figure 5:
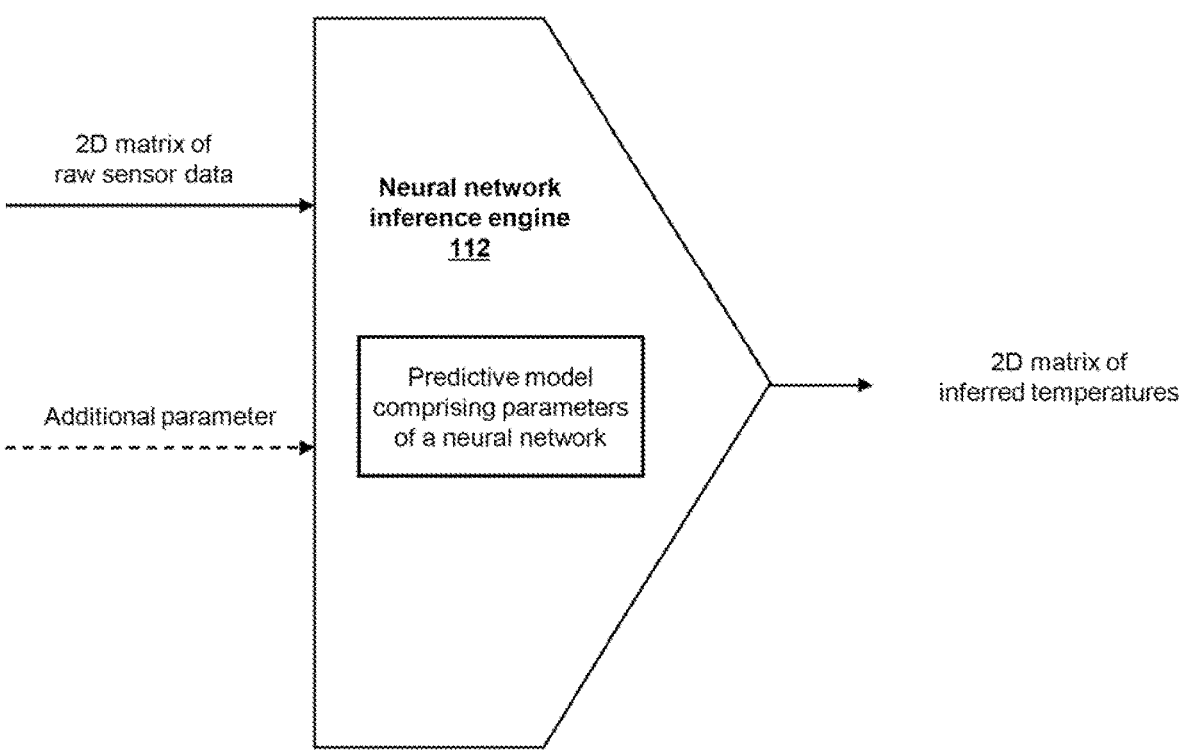
FIG. 5 is a schematic representation of a neural network inference engine executed by the computing device of FIG. 1 according to the method of FIG. 4.

Referring to FIGS. 1, 4 and 5, a schematic representation of the neural network inference engine 112 is illustrated, representing the inputs and the outputs used by the neural network inference engine 112 when performing step 535 of the method 500. For illustration purposes, the inputs include one optional additional parameter in FIG. 5. However, the inputs may include zero, one or more additional parameter(s).

Figure 6A:
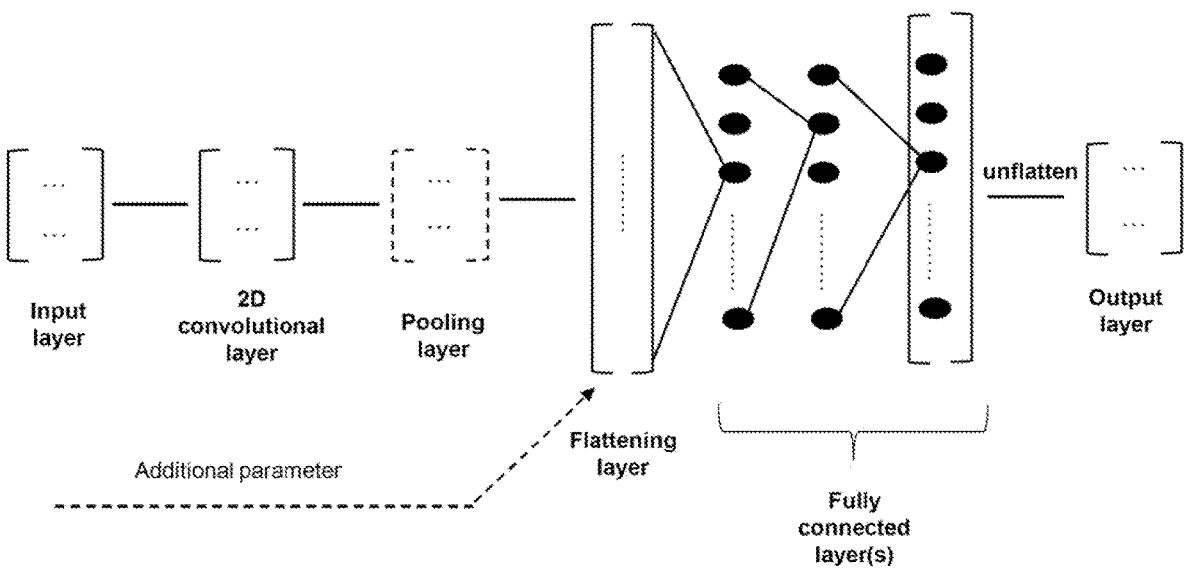
FIGS. 6A, 6B, 6C and 6D illustrate exemplary implementations of a neural network implemented by the neural network inference engine of FIG. 5.

Referring to FIGS. 2A, 5 and 6A, an exemplary detailed representation of the neural network implemented by the neural network inference engine 112 is illustrated.

The neural network includes an input layer for receiving the 2D matrix of raw sensor data, comprising M lines and N columns, as follows:

$$[R_{1,1}R_{1,2} \ldots R_{1,M}$$

$$R_{2,1}R_{2,2} \ldots R_{2,M}$$

$$R_{N,1}R_{N,2} \ldots R_{N,M}]$$

Each value of the matrix of raw sensor data is representative of heat energy collected by the IR sensing component 240 of the IR sensor 200.

The input layer is followed by a two-dimension (2D) convolutional layer which generates a convoluted 2D matrix. As is well known in the art, the 2D convolutional layer is defined by the following parameters: a two-dimensions filter and a stride. The convoluted 2D matrix comprises M' lines and N' columns, with M greater or equal than M' and N greater or equal than N'.

The 2D convolutional layer is optionally followed by a pooling layer, which generates a pooled 2D matrix. As is well known in the art, the pooling layer is defined by the following parameters: a two-dimensions filter, a stride and a pooling algorithm. The pooled 2D matrix comprises M" lines and N" columns, with M' greater than M" and N' greater than N". The role of the pooling layer is to reduce the size of the 2D matrix generated by the convolutional layer.

The 2D convolutional layer (or the pooling layer if it is present) is followed by a flattening layer. As is well known in the art, the flattening layer converts the 2D matrix of the convolutional layer (or pooling layer) into a one-dimensional (1D) matrix.

The flattening layer is followed by one or more fully connected layer. The operations of the fully connected layer(s) are well known in the art. The number of fully connected layer(s) is an integer greater or equal than 1 (FIG. 6A represents three fully connected layers for illustration purposes only). The number of neurons in each fully connected layer may vary. During the training phase of the neural network, the number of fully connected layers and the number of neurons for each fully connected layer are selected, and may be adapted experimentally.

The one or more fully connected layer is followed by an output layer for outputting the 2D matrix of inferred temperatures, comprising M lines and N columns, as follows:

$$\begin{bmatrix} T_{1,1} & T_{1,2} & \ldots & T_{1,M} \\ T_{2,1} & T_{2,2} & \ldots & T_{2,M} \\ \ldots & & & \\ T_{N,1} & T_{N,2} & \ldots & T_{N,M} \end{bmatrix}$$

Each value $T_{i,j}$ of the matrix of inferred temperatures corresponds to the corresponding value of the matrix of raw sensor data. However, by contrast to the calculation using the calibration table(s) 221, the calculation of $T_{i,j}$ using the neural network is not based only on the value $R_{i,j}$, but also on at least some other values of the matrix of raw sensor data. Thus, one advantage of using the neural network is that an erroneous value of is compensated (at least partially) by taking into consideration other values of the matrix of raw sensor data (which may be more accurate) for the calculation of $T_{i,j}$.

As illustrated in FIG. 6A, the last layer of the fully connected layer(s) is un-flattened, to convert the 1D matrix of the last fully connected layer into the 2D matrix of the output.

Although a single 2D convolution layer (and a corresponding optional pooling layer) is represented in FIG. 6A, several consecutive 2D convolution layers (and corresponding optional pooling layers) may be included in the neural network, as is well known in the art.

As illustrated in FIG. 6A, any additional parameter (e.g. input voltage and/or ambient temperature of the IR sensor 200) is not processed by the 2D convolutional layer(s), but directly injected in the flattening layer, as is well known in the art.

Figure 6B:
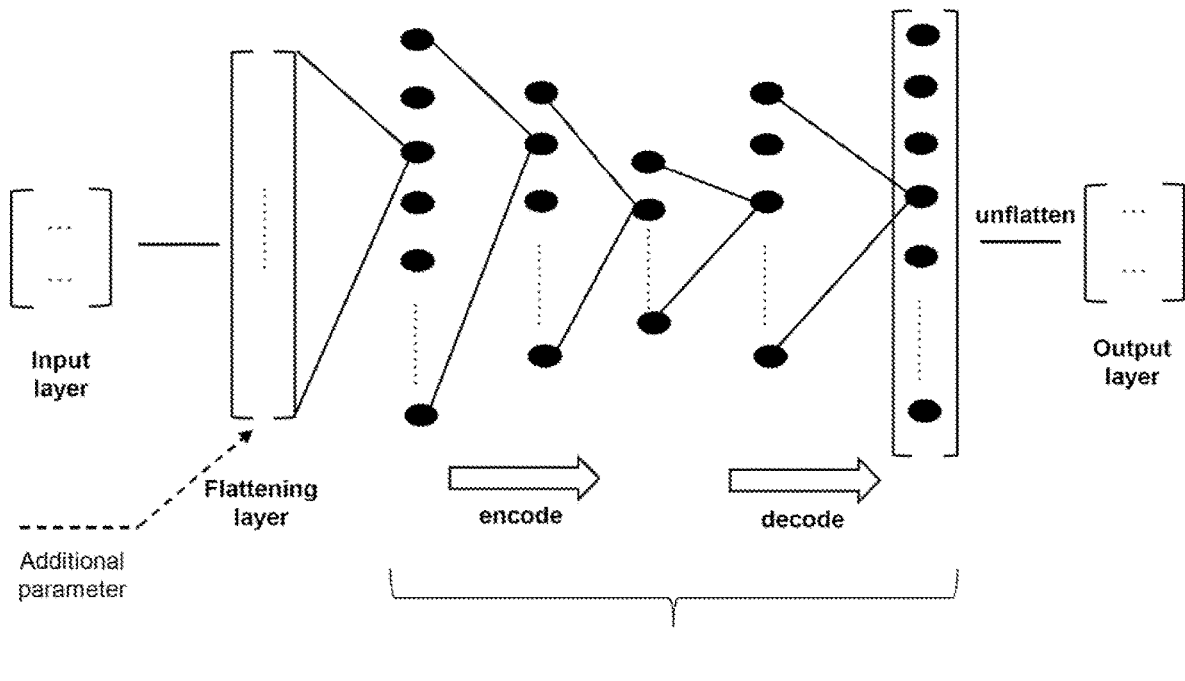

Referring to FIGS. 5 and 6B, another exemplary detailed representation of the neural network implemented by the neural network inference engine 112 is illustrated.

The neural network includes an input layer for receiving the 2D matrix of raw sensor data.

The input layer is followed by a flattening layer for converting the 2D matrix of raw sensor data into a 1D matrix.

The flattening layer is followed by auto-encoding layers. The auto-encoding layers consist of several fully connected layers adapted to implement the auto-encoding functionality. As is well known in the art, the first layers among the auto-encoding layers perform an encoding functionality and the last layers among the auto-encoding layers perform a decoding functionality. The central layer(s) among the auto-encoding layers has (have) less neurons than the first (encoding) and last (decoding) layers among the auto-encoding layers, to perform a compression of the data at the central layer(s).

The auto-encoding layers are followed by an output layer for outputting the 2D matrix of inferred temperatures. As illustrated in FIG. 6B, the last layer among the auto-encoding layers is un-flattened, to convert the 1D matrix of the last layer among the auto-encoding layers into the 2D matrix of the output.

As illustrated in FIG. 6B, any additional parameter (e.g. input voltage and/or ambient temperature of the IR sensor 200) is injected in the flattening layer.

A neural network combining the functionalities illustrated in FIGS. 6A and 6B may also be used. For example, the neural network is similar to the one represented in FIG. 6A, with the fully connected layers implementing an auto-encoding functionality as illustrated in FIG. 6B.

Figure 6C:
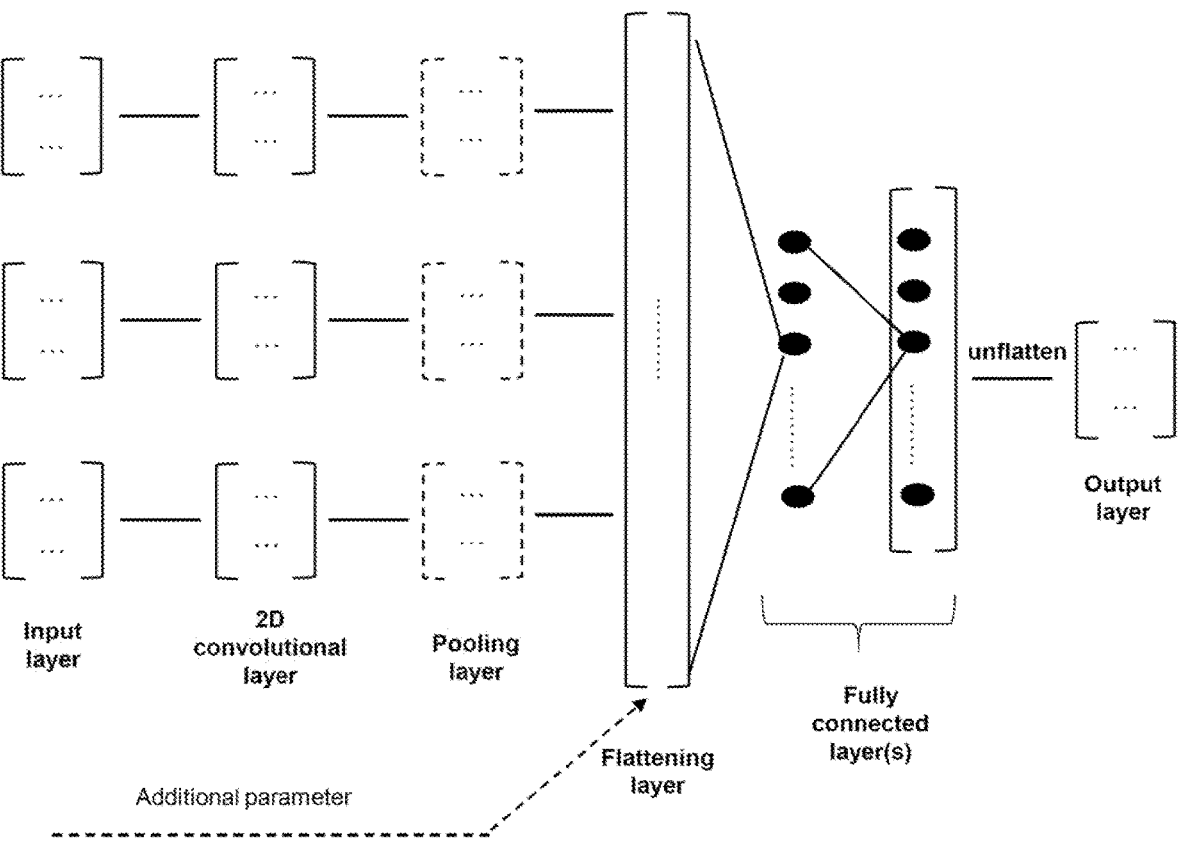
Figure 6D:
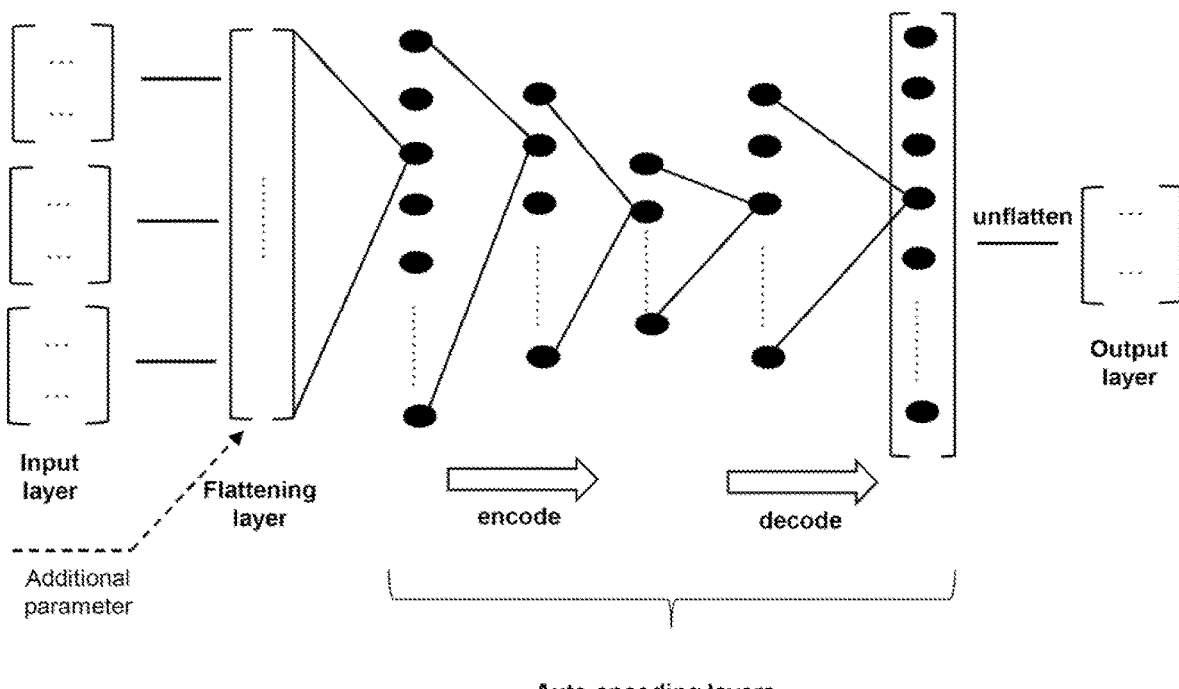

Referring to FIGS. 2A, 5 and 6C, still another exemplary detailed representation of the neural network implemented by the neural network inference engine 112 is illustrated.

The neural network includes an input layer for receiving a plurality of 2D matrices of raw sensor data. In this implementation, step 525 of the method 500 is repeated several times before performing step 535. A series of I consecutive 2D matrices of raw sensor data is received from the IR sensor 200, where I is an integer greater or equal than 2. For example, a matrix is received every second and when 3 matrices have been received (I=3), step 535 is performed (as illustrated in FIG. 6C).

The input layer is followed by a 2D convolutional layer applying I respective 2D convolutions to the I input matrices of raw sensor data, to generate I convoluted 2D matrices.

The 2D convolutional layer is optionally followed by a pooling layer, which generates I pooled 2D matrices, respectively corresponding to the I convoluted 2D matrices of the previous layer.

The 2D convolutional layer (or the pooling layer if it is present) is followed by a flattening layer. The flattening layer converts the I 2D matrices of the convolutional layer (or pooling layer) into a 1D matrix.

The flattening layer is followed by one or more fully connected layer. The one or more fully connected layer is followed by an output layer for outputting the 2D matrix of inferred temperatures.

As illustrated in FIG. 6C, the last layer of the fully connected layer(s) is un-flattened, to convert the 1D matrix of the last fully connected layer into the 2D matrix of the output.

Although a single 2D convolution layer (and a corresponding optional pooling layer) is represented in FIG. 6C, several consecutive 2D convolution layers (and corresponding optional pooling layers) may be included in the neural network. Any additional parameter (e.g. input voltage and/or ambient temperature of the IR sensor 200) is not processed by the 2D convolutional layer(s), but directly injected in the flattening layer.

In yet another implementation illustrated in FIG. 2D, the plurality of consecutive 2D matrices of raw sensor data are processed by a neural network similar to the one represented in FIG. 6B (no 2D convolutional layer and a plurality of fully connected layers implementing an auto-encoding functionality).

A person skilled in the art would readily understand that the aforementioned implementations of the neural network are for illustration purposes only. Other implementations of the neural network may be used for achieving the functionality of bypassing the calibration table(s) 221 of the IR sensor 200.

Figure 7:
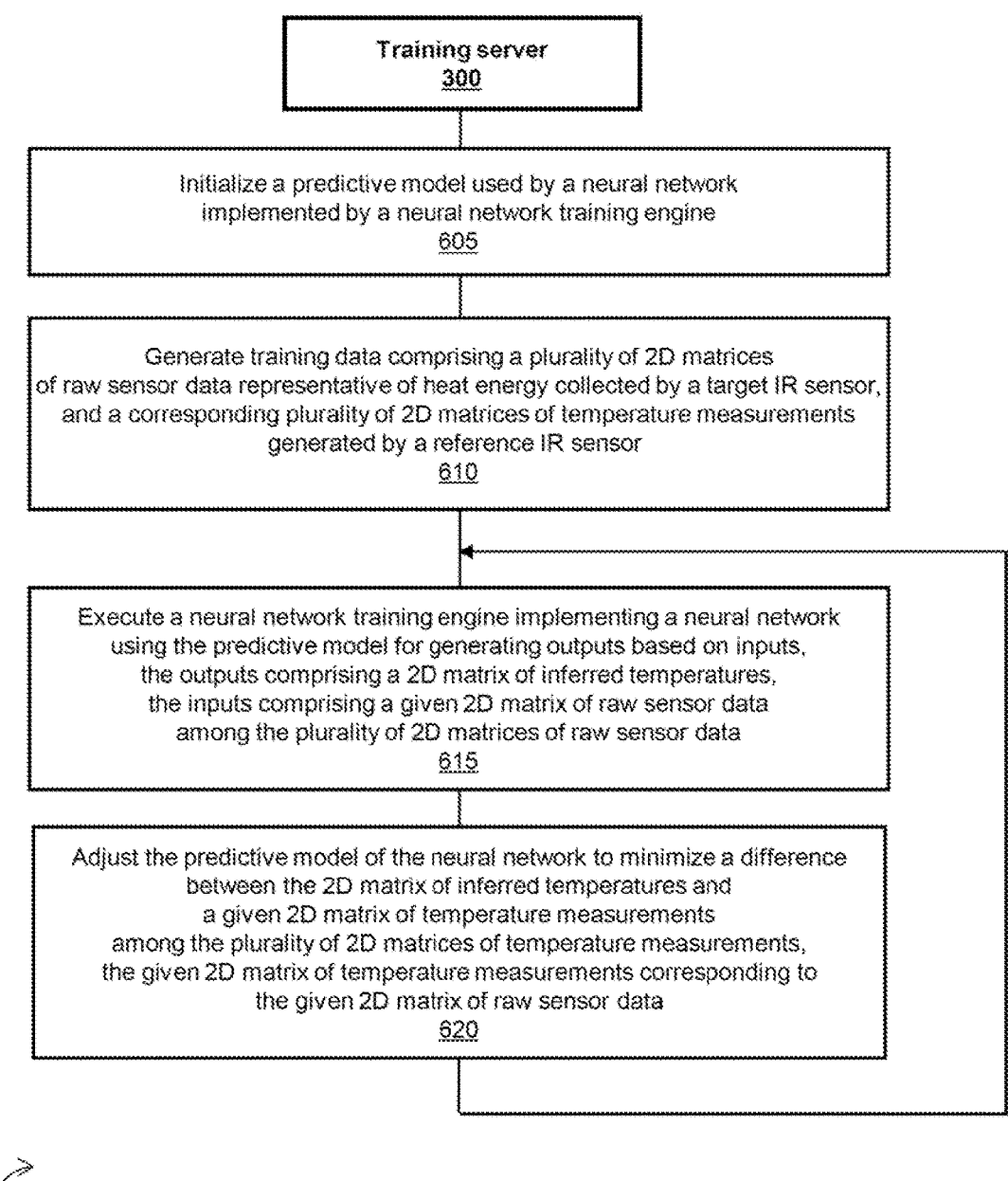
FIG. 7 illustrates a method implemented by the training server of FIG. 1, for training a neural network to bypass calibration data of the IR sensor of FIG. 1.

Reference is now made concurrently to FIGS. 1, 2A, 2B, 3 and 7. FIG. 7 represents a method 600 for training a neural network to bypass calibration data of an infrared sensor. At least some of the steps of the method 600 represented in FIG. 7 are implemented by the training server 300. The present disclosure is not limited to the method 600 being implemented by the training server 300, but is applicable to any type of computing device capable of implementing the steps of the method 600.

A dedicated computer program has instructions for implementing at least some of the steps of the method 600. The instructions are comprised in a non-transitory computer program product (e.g. the memory 320) of the training server 300. The instructions provide for training a neural network to bypass calibration data of an infrared sensor, when executed by the processing unit 310 of the training server 300. The instructions are deliverable to the training server 300 via an electronically-readable media such as a storage media (e.g. CD-ROM, USB key, etc.), or via communication links (e.g. via a communication network through the communication interface 330).

The instructions of the dedicated computer program executed by the processing unit 310 implement the neural network training engine 311 and the control module 314. The neural network training engine 311 provides functionalities of a neural network, allowing to generate a predictive model ready to be used by the neural network inference engine 112 (executed by the computing device 100) at the end of the training, as is well known in the art. The control module 314 provides functionalities allowing the training server 300 to gather data used for the training of the neural network.

The method 600 comprises the step 605 of initializing a predictive model used by the neural network implemented by the neural network training engine 311. Step 605 is performed by the control module 314 executed by the processing unit 310 of the training server 300. The predictive model comprises various parameters which depend on the characteristics of the neural network implemented by the neural network training engine 311.

The initialization of the predictive model comprises defining a number of layers of the neural network, a functionality for each layer (e.g. convolutional layer, fully connected layer, etc.), initial values of parameters used for implementing the functionality of each layer, etc. The initialization of the predictive model is performed by a person highly skilled in the art of neural networks.

For example, the initialization of the parameters of a fully connected layer includes determining the number of neurons of the fully connected layer and determining an initial value for the weights of each neuron. Different algorithms (well documented in the art) can be used for allocating an initial value to the weights of each neuron. For example, each weight is allocated a random value within a given interval (e.g. a real number between −0.5 and +0.5), which can be adjusted if the random value is too close to a minimum value (e.g. −0.5) or too close to a maximum value (e.g. +0.5). In another example, the initialization of the parameters of a convolutional layer includes determining the size and values of the filter and the value of the stride.

A comprehensive description of the initialization of the predictive model is out of the scope of the present disclosure, since it is well known in the art of neural networks and is different for each type of layer (e.g. a fully connected layer, a convolutional layer, a pooling layer, etc.).

The data used for the initialization of the predictive model are received from a person via the user interface 340, and/or received from a remote computing device (not represented in FIG. 3) via the communication interface 330, and/or generated by a software program executed by the processing unit 310 (e.g. random generation of the initial value of the weights).

Although not represented in FIG. 7 for simplification purposes, the predictive model initialized at step 605 is stored in the memory 320 of the training server 300.

The method 600 comprises the step 610 of generating training data. The training data comprise a plurality of 2D matrices of raw sensor data representative of heat energy collected by the IR sensor 200 and a corresponding plurality of 2D matrices of temperature measurements generated by a reference IR sensor 400.

The IR sensor 200 is the sensor for which the calibration table(s) 221 need to be bypassed through the usage of a neural network. The reference IR sensor 400 is a sensor for which it has been determined that the generation of the 2D matrices of temperature measurements is sufficiently accurate.

For example, the IR sensor 200 is a low end sensor for which it is known that the generation of the 2D matrices of temperature measurements (based on its calibration table(s) 221) is not sufficiently accurate. The reference IR sensor 400 is a high end sensor providing the appropriate level of accuracy for the temperature measurements.

The IR sensor 200 and the reference IR sensor 400 are put in various operating conditions. For example, a reference object is illuminated with different lighting conditions, to modify the temperature at different positions of a given surface of the reference object. For each operating condition, the IR sensor 200 and the reference IR sensor 400 are pointed to the given surface of the reference object. The IR sensor 200 transmits a 2D matrix of raw sensor data and the reference IR sensor 400 transmits a corresponding 2D matrix of temperature measurements, which are received by the training server 300 via the communication interface 330.

In the case where additional inputs (e.g. input voltage and/or ambient temperature of the IR sensor 200) are used by the neural network, these additional inputs are also collected at step 610 and integrated to the training data.

The method 600 comprises the step 615 of executing the neural network training engine 311. The neural network training engine 311 implements the neural network using the predictive model for generating outputs based on inputs. The execution of the neural network training engine 311 is performed by the processing unit 310 of the training server 300.

The inputs comprise a given 2D matrix of raw sensor data among the plurality of 2D matrices of raw sensor data generated at step 610. The outputs comprise a 2D matrix of inferred temperatures.

The neural network implemented by the neural network training engine 311 corresponds to the neural network implemented by the neural network inference engine 112 (same number of layers, same functionality for each layer, same parameters used for implementing the functionality of each layer, etc.). As mentioned previously, FIGS. 6A, 6B, 6C and 6D are exemplary representations of such a neural network.

The method 600 comprises the step 620 of adjusting the predictive model of the neural network, to minimize a difference between the 2D matrix of inferred temperatures (calculated at step 615) and a given 2D matrix of temperature measurements among the plurality of 2D matrices of temperature measurements (generated at step 610). The given 2D matrix of temperature measurements corresponds to the given 2D matrix of raw sensor data (used as inputs of the neural network at step 615). Step 620 is performed by the neural network training engine 311 executed by the processing unit 310 of the training server 300.

As is well known in the art, step 620 aims at minimizing a difference between outputs calculated by the neural network and expected outputs of the neural network, through the adjustment of the predictive model of the neural network (more specifically by adjusting parameters of the neural network comprised in the predictive model). For example, for a fully connected layer of the neural network, the adjustment comprises adjusting the weights associated to the neurons of the fully connected layer. In another example, for a convolutional layer of the neural network, the adjustment comprises adjusting the values of the filter used by the convolutional layer.

As is well known in the art, steps 615-620 are repeated for several given 2D matrices of raw sensor data selected among the plurality of 2D matrices of raw sensor data (generated at step 610). The training data need to be large enough to properly train the neural network.

The implementation of the method 600 with respect to steps 610-620 may vary. For example, batches of N tuple(s) are selected among the training data, N being an integer greater or equal than 1. A tuple comprises a given 2D matrix of raw sensor data and the corresponding 2D matrix of temperature measurements. Step 615 is performed for the N tuple(s) of a given batch. Step 620 is performed taking into consideration the N output(s) of the neural network calculated at step 615. Thus, the adjustment of the predictive model at step 720 is performed by taking into consideration the N tuple(s) simultaneously. This process is repeated for each batch of N tuple(s). At the end of the process, a new set of batches of N tuple(s) may be selected and the process repeated.

Although not represented in FIG. 7 for simplification purposes, the modifications to the predictive model of the neural network performed at step 620 are stored in the memory 320 of the training server 300.

Steps 605, 610, 615 and 620 of the method 600 correspond to step 505 of the method 500 represented in FIG. 4.

At the end of the training phase, the neural network is considered to be properly trained (the predictive model of the neural network has been adjusted so that a difference between the expected outputs and the calculated outputs has been sufficiently minimized). The predictive model, comprising the adjusted parameters of the neural network, is transmitted to the computing device 100, as illustrated by step 510 of the method 500 represented in FIG. 4.

Test data are optionally used to validate the accuracy of the predictive model. The test data are different from the training data used at steps 610-615-620. This procedure well known in the art of neural networks is not represented in FIG. 7 for simplification purposes.

Various techniques well known in the art of neural networks can be used for performing step 620. For example, the adjustment of the predictive model of the neural network at step 620 uses back propagation. Other techniques, such as the usage of bias in addition to the weights (bias and weights are generally collectively referred to as weights in the neural network terminology), reinforcement training, etc., may also be used.

Furthermore, the evaluation of the difference between the expected outputs and the calculated outputs of the neural network at step 620 may be implemented in different ways. In an exemplary implementation, the parameters of the neural network are adjusted so that each value of the given 2D matrix of inferred temperatures is substantially equal to the corresponding value of the given 2D matrix of temperature measurements. A tolerance interval is usually used when performing the comparison between the calculated and expected values (e.g. a tolerance of 1% in absolute value is acceptable).

In a particular implementation, the neural network training engine 311 and the neural network inference engine 112 are implemented by the same computing device 100. In this case, the steps of the method 600 (represented in FIG. 7) and the steps of the method 500 (represented in FIG. 4) are performed by the same computing device 100 (the functionalities of the training server 300 are implemented by the computing device 100).

The training process may be implemented in two steps for a given type of IR sensor 200. The method 600 is applied to a first IR sensor of the given type, and a generic predictive model is generated. Then, for each other IR sensor of the given type, the method 600 is applied using the generic predictive model at step 605, and generating a specific predictive model adapted to each specific IR sensor of the given type. The quantity of training data for the second step is lower than the quantity of training data for the first step, since the second step consists of a fine-tuning of the training performed at the first step.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller comprising:
a communication interface;
a memory for storing a predictive model generated by a neural network training engine; and
a processing unit comprising one or more processors configured to:
   receive via the communication interface a two-dimensional (2D) matrix of raw sensor data from an infrared (IR) sensor, each raw sensor datum being representative of heat energy collected by the IR sensor, the 2D matrix of raw sensor data having M lines and N columns, M and N being integers greater than 1;
   execute a neural network inference engine, the neural network inference engine implementing a neural network using the predictive model for generating outputs based on inputs, the inputs comprising the 2D matrix of raw sensor data, the outputs comprising a 2D matrix of inferred temperatures, the 2D matrix of inferred temperatures having M lines and N columns;
   generate based at least on the 2D matrix of inferred temperatures one or more commands for controlling operations of a controlled appliance, the controlled appliance and the environment controller being part of an environment control system of a building; and
   transmit the one or more commands to the controlled appliance via the communication interface.

2. The environment controller of claim 1, wherein each raw sensor datum is a digital count representative of heat energy collected by the IR sensor.

3. The environment controller of claim 1, wherein the IR sensor consists of an IR camera.

4. The environment controller of claim 1, wherein the processing unit further receives via the communication interface at least one of an ambient temperature of the IR sensor and an input voltage of the IR sensor, and the inputs of the neural network include at least one of the ambient temperature of the IR sensor and the input voltage of the IR sensor.

5. The environment controller of claim 1, wherein the neural network comprises at least one two-dimensional (2D) convolutional layer, and at least one fully connected layer, a first layer among the at least one 2D convolutional layer applying a 2D convolution to the 2D matrix of raw sensor data.

6. The environment controller of claim 1, wherein the neural network comprises a plurality of fully connected layers implementing an auto-encoding functionality.

7. The environment controller of claim 1, wherein the processing unit receives a plurality of consecutive 2D matrices of raw sensor data from the IR sensor, and the inputs of the neural network comprise the plurality of consecutive 2D matrices of raw sensor data.

8. The environment controller of claim 1, wherein the controlled appliance is a heater, a light, or a heating, ventilation, and air-conditioning (HVAC) appliance; and generating based at least on the 2D matrix of inferred temperatures one or more commands for controlling operations of the controlled appliance comprises:
   determining based at least on the 2D matrix of inferred temperatures that one or more persons are present in an area of the building; and
   generating a command for switching on the controlled appliance.

9. The environment controller of claim 1, wherein the controlled appliance is a heating, ventilation, and air-conditioning (HVAC) appliance; and generating based at least on the 2D matrix of inferred temperatures one or more commands for controlling operations of the controlled appliance comprises:
   determining based at least on the 2D matrix of inferred temperatures that one or more persons are present in an area of the building; and
   generating a command for switching on the HVAC appliance.

10. A method using a neural network to bypass calibration data of an infrared (IR) sensor, the method comprising:
   storing a predictive model generated by a neural network training engine in a memory of a computing device;
   determining by a processing unit of the computing device a two-dimensional (2D) matrix of raw sensor data, each raw sensor datum being representative of heat energy collected by the IR sensor, the 2D matrix of raw sensor data having M lines and N columns, M and N being integers greater than 1;
   executing by the processing unit of the computing device a neural network inference engine, the neural network inference engine implementing the neural network using the predictive model for generating outputs based on inputs, the inputs comprising the 2D matrix of raw sensor data, the outputs comprising a 2D matrix of inferred temperatures, the 2D matrix of inferred temperatures having M lines and N columns;
   generating at an environment controller based at least on the 2D matrix of inferred temperatures one or more commands for controlling operations of a controlled appliance, the controlled appliance and the environment controller being part of an environment control system of a building; and transmitting by the environment controller the one or more commands to the controlled appliance.

11. The method of claim 10, wherein each raw sensor datum is a digital count representative of heat energy collected by the IR sensor.

12. The method of claim 10, wherein the IR sensor consists of an IR camera.

13. The method of claim 10, wherein the computing device consists of the environment controller and determining by the processing unit the 2D matrix of raw sensor data comprises receiving via a communication interface of the computing device the 2D matrix of raw sensor data from the IR sensor.

14. The method of claim 10, wherein the computing device consists of the IR sensor, and the determination by the processing unit of the 2D matrix of raw sensor data is based on data collected by an IR sensing component of the IR sensor.

15. The method of claim 10, further comprising determining by the processing unit at least one of an ambient temperature of the IR sensor and an input voltage of the IR sensor, and wherein the inputs of the neural network include at least one of the ambient temperature of the IR sensor and the input voltage of the IR sensor.

16. The method of claim 10, wherein the neural network comprises at least one two-dimensional (2D) convolutional layer, and at least one fully connected layer, a first layer among the at least one 2D convolutional layer applying a 2D convolution to the 2D matrix of raw sensor data.

17. The method of claim 10, wherein the neural network comprises a plurality of fully connected layers implementing an auto-encoding functionality.

18. The method of claim 10, wherein the processing unit receives a plurality of consecutive 2D matrices of raw sensor data from the IR sensor, and the inputs of the neural network comprise the plurality of consecutive 2D matrices of raw sensor data.

19. The method of claim 10, wherein the controlled appliance is a heater, a light, or a heating, ventilation, and air-conditioning (HVAC) appliance; and generating at an environment controller based at least on the 2D matrix of inferred temperatures one or more commands for controlling operations of the controlled appliance comprises:

determining at the environment controller based at least on the 2D matrix of inferred temperatures that one or more persons are present in an area of the building; and generating at the environment controller a command for switching on the controlled appliance.

20. The method of claim 10, wherein the controlled appliance is a heating, ventilation, and air-conditioning (HVAC) appliance; and generating at an environment controller based at least on the 2D matrix of inferred temperatures one or more commands for controlling operations of the controlled appliance comprises:

determining at the environment controller based at least on the 2D matrix of inferred temperatures that one or more persons are present in an area of the building; and generating at the environment controller a command for switching on the HVAC appliance.

\* \* \* \* \*